Oct. 18, 1966 R. E. BOWLES 3,279,531
AIR CONDITIONING SYSTEM
Filed Feb. 4, 1964 2 Sheets-Sheet 1

INVENTOR
ROMALD E. BOWLES

BY *Hurwitz & Rose*

ATTORNEYS

INVENTOR
ROMALD E. BOWLES

BY *Hurvitz & Rose*

ATTORNEYS

United States Patent Office 3,279,531
Patented Oct. 18, 1966

3,279,531
AIR CONDITIONING SYSTEM
Romald E. Bowles, Silver Spring, Md., assignor to Bowles Engineering Corporation, Silver Spring, Md., a corporation of Maryland
Filed Feb. 4, 1964, Ser. No. 342,569
21 Claims. (Cl. 165—26)

The present invention relates to air-conditioning systems and, more particularly, to a unitary system for maintaining temperatures internally of an enclosure relatively constant over a range of outside temperatures of more than 100°.

Apparatus of the type with which the present invention is concerned are employed in some industrial and commercial establishments but are of primary interest in the automobile air-conditioning field. A system which is presently available in this field provides completely automatic control of the passager compartment of an automobile in spite of variations in outside temperatures from −10° to +115° F., with a maximum temperature handling capability of 150° F. The only manual control in the entire system is that which the individual occupying the vehicle employs to set the desired temperature. The system then maintains this temperature regardless of outside conditions.

In the particular system under discussion as well as in other prior art systems, air is inducted into the system through a blower and passed over evaporating and cooling coils which cools the air and extracts the water thus insuring low humidity in the enclosure. The air is then directed towards a pair of parallel ducts in one of which a heater is disposed and the other of which by-passes the heater. The two channels converge into a common channel and the amount of heat added to the air is controlled by controlling the portion of air passing over the heater and the proportion of air by-passed around the heater. Thus, the final temperature is a function of the quantity of heat added to the cooled air. Under extreme conditions, the heater or the evaporator may be effectively removed from the system so as to maximize cooling or heating, respectively.

The system is controlled by three thermostats; one located to sense outside air temperatures, one located to sense temperature at the dashboard of the automobile, and one located to sense the temperature at the output of the blower. The three thermostats produce electrical signals which are summed, not necessarily linearly, to produce a control voltage that is further modified by the manual temperature control. The final voltage thus developed is applied to a vacuum transducer which modulates a variable vacuum applied to a servo motor; the vacuum being derived initially from the input manifold of the automobile engine.

The servo motor performs various functions in the system being described; its primary function being positioning of a temperature door for controlling the division of air between the heating and by-pass ducts. The servo motor also controls the blower speed, a mode door, recirculation of internal air, a suction throttle valve in the evaporator, a water control valve in the heater and a fast-idle adjustment on the carburetor.

Taking the above functions in order, the mode door is employed to control the region in which the air is introduced into the passenger compartment. Heated air above a prescribed temperature is applied to the lower region of the passenger compartment whereas cooled air is applied to an upper region of the compartment. The recirculation control is employed when maximum cooling is required to prevent hot outside air being brought into the system. The recirculate door is also under the control of a completely separate subsystem which positions the door to close the external air duct and thereby prevent entry of external air as a result of ram air pressure during the period before the engine has warmed up on starting. A water temperature sensing device is employed to control the recirculate door and to keep the blower turned off so that there is no recirculation of air in the car when the engine water temperature is below 120° F., while heat is being demanded by the system.

The suction throttle valve is on the evaporator and during extremely cold conditions, the valve is positioned so as to eliminate cooling by the evaporator coils. The water control valve is controlled at the opposite end of the range; that is, when it is extremely hot and the system must provide a maximum degree of cooling. Under these circumstances, the water control valve is closed and prevents flow of hot engine water through the heater radiator. Another control provided from the servo motor is fast-idle control. The idling speed of the motor is increased whenever the compressor is running in order to handle the extra load.

The apparatus described above is quite satisfactory in operation and difficulty resides, not in the equipment's performance, but in the complexity and cost of the system. The system is fully automatic with the only manual control being that of setting the desired interior temperature. Such a system is expensive and, consequently, limited in extent of use and applicability.

In accordance with the present invention, there is provided a system which is quite simple in design and relatively inexpensive in production and which, although it does not provide completely automatic operation, does provide for automatic control of air heating and cooling over a large range of ambient temperatures, leaving only a few functions to the control of the automobile operator. More particularly, the system of the present invention provides or may provide, in a basic, fully automatic, and relatively inexpensive apparatus, the same functions or functions which are analogous to the temperature door control, mode door control, blower speed control, fast-idle control, and cold temperature control of recirculation as provided by the previously described system.

The invention achieves its simplicity of structure and operation by the utilization of the principles of pure fluid amplification. In the system, an analog, i.e. proportional, fluid amplifier is employed in place of the temperature door. Control of the distribution of fluid between a heating channel and a by-pass channel is effected by fluid leaks controlled by bimetallic elements placed substantially as in the prior art systems. The mode door operation is effected by a fluid diverter valve of the boundary layer type of pure fluid amplifier. The latter amplifier may be differentially controlled by a bimetallic element or manually controlled. Blower speed, as such, is not controlled. In the simplest system, this function may be eliminated but, at very little additional cost, a function analogous to blower speed control may be provided. The analog amplifier employed to provide the temperature door function is constructed with a center air dump, so that when there is substantially equal distribution of air between the heating and the by-pass ducts, this being a condition at which little temperature control is being effected, a large proportion of the air is dumped; that is, by-passed to the outside or, alternatively, is routed to the blower intake to be recirculated. Under these circumstances, a reduced quantity of air flows through the remainder of the system to the passenger compartment.

Thus, with an unusually simple system, the temperature door, mode door and blower speed operations may be achieved, such a system having as its moving parts only the blower and the bimetallic elements. The throttle valve in the evaporator, water control valve in the heater and fast-idle function are not controlled in the simplest system. The throttle and water valve controls are required only at the extremes of operating conditions as is true of the recirculation control. The low temperature control for recirculation may be effected in the same manner as in the prior art system by control of application of vacuum to the recirculate door as a function of engine water temperature. The fast-idle control as an automatic high ambient temperature control may be added by sensing compressor pressure or evaporation temperature (which are closely related) as an indication that the compressor is about to be coupled to the engine and therefore engine speed should be increased. In systems using an electric clutch to engage the compressor, the same electric signal can readily be applied to a solenoid-operated, by-pass valve in the carburetor to provide fast-idle operation. The suction throttle valve and water control valve may be controlled manually for extreme operating conditions with a minimum of additional equipment by employing either an auxiliary manual control lever used only for extreme heating or cooling load conditions or by employing the manual temperature controller to provide a modified form of extreme load condition control. The temperature controller provides a ready source of movement from which these modified valve control functions may be obtained. Note that the suction throttle valve is to be closed during extreme heating conditions to eliminate cooling, while the water control valve on the heater is closed during extreme cooling conditions to eliminate flow of heat to the air duct region. Thus, by connecting these valves, for instance, through Belsen wires to an auxiliary manual control lever or to the manually set temperature controller, the direct operation of these valves may be effected, each valve being operated when the lever is moved to its extreme position calling for a function opposite to that provided by the apparatus associated with the valve.

The apparatus of the present invention provides for automatic control of the major functions of air-conditioning equipment by an extremely simple and inexpensive structure and, by a minimum of additional manual controls, approximates substantially all of the functions of the prior system at very little extra expense and still at a lower overall cost and, hence, a greater range of applicability.

In the above description, certain types of manual controls are described. As will become apparent during the detailed description of the present invention, other types of manual controls may be applied if desired.

It is an object of the present invention to provide a simple, relatively inexpensive, air-conditioning unit for maintaining temperature within a closure at desired levels over relatively extreme ranges of outside temperatures.

It is another object of the present invention to provide an air-conditioning unit employing continuously operable cooling and heating units in series, wherein control of the temperature is effected by controlling the portions of fluid directed over the heating unit relative to the proportion of fluid by-passed around a heating unit, the apparatus employing a minimum of moving parts and employing pure fluid amplifiers to control various of the functions required of the system.

It is yet another object of the present invention to provide an air-conditioning system for maintaining substantially constant the interior temperature of an enclosure over an extreme range of outside temperatuers, the invention employing fluid amplifiers to effect the various heating and cooling functions and employing bimetallic or other temperature-responsive elements to control directly the fluid amplifiers so as to eliminate electric and electromechanical transducers and conversion apparatus from the basic systems.

Another object of the present invention is to provide an air-conditioning system employing a pure fluid amplifier operated such that its internal pressure is below ambient pressure and employing thermal-responsive elements to control the bleed of fluid to a control nozzle of the amplifier so as to proportion flow of cooled fluid between two output channels, a heating unit being located in one of the channels.

The above and still further objects, features and advantages of the present invention will become apparent upon consideration of the following detailed description of several specific embodiments thereof, especially when taken in conjunction with the accompanying drawings, wherein.

Figure 1:
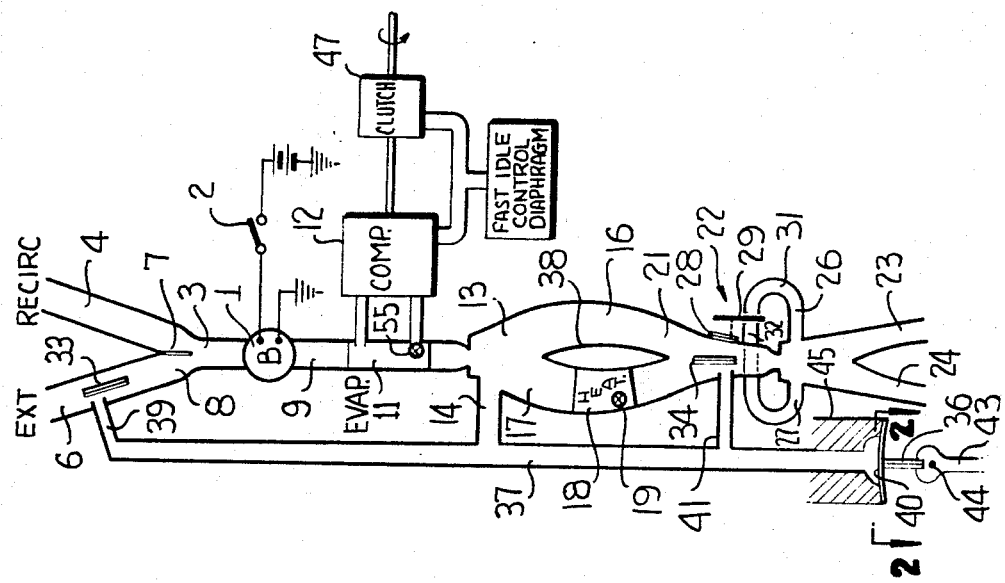
FIGURE 1 is a schematic flow diagram of the first embodiment of the present invention.
Figure 5:
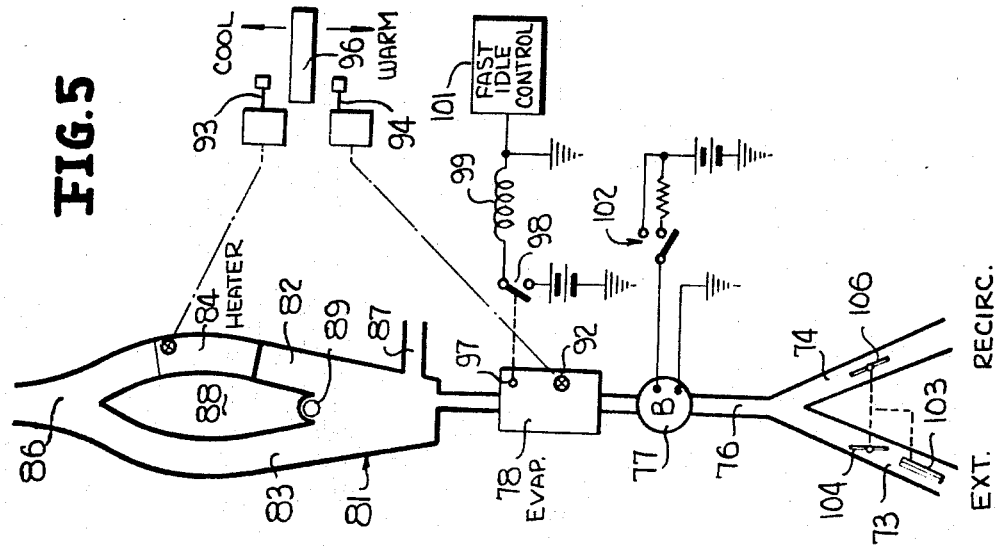
FIGURE 5 is a flow diagram of a modified portion of the apparatus of FIGURE 1.

Referring now specifically to FIGURE 1 of the accompanying drawings, there is illustrated the basic air-conditioning system of the present invention and various additional features forming one specific embodiment of the apparatus. Flow through the system is generated by a blower 1 driven by an electric motor controlled by an on-off switch 2. The blower is supplied with air through a duct 3 which may receive air alternatively or concurrently from two input ducts 4 and 6, the input duct 4 receiving air from the interior of the vehicle and the inlet duct 6 being arranged to receive ambient air. A conventional flapper valve 7 may be provided at the confluence of the ducts 4 and 6 to control recirculation of interior air, particularly during cooling. A stop 8 may be provided for the flapper valve 7 so that a minimum of twenty percent external air is provided in order to prevent carbon monoxide poisoning, etc.

The pressure side of the blower 1 supplies air through a passage or duct 9 to evaporator coils 11 which receive pressurized fluid from a compressor 12. The evaporator 11 includes the usual throttling and expansion valves to effect the desired cooling interiorly of the evaporator.

The fluid egressing from the evaporator 11 is supplied to a pure fluid amplifier generally designated by the reference numeral 13. The pure fluid amplifier is provided with a control passage 14 and two output ducts 16 and 17. The amplifier 13 is designed such that in the absence of a supply of air or other suitable fluid to the passage 14, the fluid issuing into the amplifier 13 is directed to the output channel or duct 17 and substantially none of the fluid flows to the duct 16. A heater 18 is disposed in the duct 17 to provide the heating function of the apparatus, the heater 18 being supplied water through a hot water control valve 19 from the engine water system. The ducts 16 and 17 are connected together downstream of the heater 18 to form a single flow channel 21 in which the heated air and the air by-passed around the heater through the duct 16 are mixed to provide fluid of the desired temperature.

The fluid in the duct 21 may be supplied directly to the passenger compartment or through a second fluid amplifier 22 to the passenger compartment. The fluid amplifier 22 is a diverter valve employed to provide the mode door function if such is desired. The amplifier 22 is basically pure fluid flip-flop having output channels 23 and 24 and control nozzles 26 and 27, respectively. The diverter valve 22 may be controlled by a bimetal 28 that drives a flapper 29 mechanically coupled thereto. The flapper 29 is positioned between oppositely directed ends of passages 31 and 32 connected to the control nozzles 26 and 27, respectively. If the temperature of the fluid in the duct 21 is, for instance, above 70° the flapper valve 29 is moved to close the end of the passage 31 so that fluid issuing into the diverter valve 22 is directed to the output passage 23. If the fluid in duct 21 is below approximately 70°, the flapper valve 29 covers the end of the passage 32 and fluid in the diverter valve 22 is directed to the output passage 24. There is, of course, hysteresis in the operation of the diverter valve due to the movements of the flapper 29 required to switch the stream. The passage 24 directs fluid to the upper region of the car so that it flows over the passengers at about shoulder level, whereas the passage 23 directs the fluid towards the feet. Thus, the warm air is directed predominantly towards the feet and the cold air is directed predominantly towards the shoulders. Mode door operation may be controlled manually by controlling the flapper 29 manually or by a manual override rather than by a bimetal alone.

In the operation of the system as thus far described, the apparatus is controlled primarily by three bimetallic elements, the element 33 located in the duct 6, the element 34 located in the duct 21 at the confluence of the fluids from the ducts 16 and 17, and a third bimetallic element 36 located at the dash of the car. The bimetallic elements are in parallel and individually control the leak of fluid into the control passage 14 of the fluid analog amplifier 13. More particularly, the temperature responsive elements are positioned adjacent the ends of tubes connected to a manifold 37 so as to control the admission of air thereto. The analog amplifier 13 is designed such that the region between its entrance or power nozzle and the fork formed by the passages 16 and 17 is maintained below ambient pressure; that is, below atmospheric pressure. More particularly, the movement of the high velocity stream through the analog amplifier entrains sufficient air to reduce the pressure in the amplifier below atmospheric. If the manifold 37 is isolated from atmospheric pressure, the ends of all the tubes are closed, substantially no fluid is admitted to the control passage 14 of the analog amplifier. The amplifier is designed such that, under these conditions, all the fluid issuing into the amplifier is directed to the output passage 17. Such operation may be achieved by asymmetrical location of divider 38, which forms an island between the ducts 16 and 17, and/or by asymmetrical location of the sidewalls of the device and/or by employing different angles of divergence of the sidewalls relative to the entrance nozzle centerline. The effect on operation of these parameters is well known and, for a more complete discussion of the subject, reference is made to the introduction of U.S. Patent No. 3,111,291 of Billy M. Horton. The actual structure employed in the present invention is discussed consequently.

Referring now particularly to the arrangement of the bimetals and their associated ducts, the bimetal 33 has positioned adjacent its movable end, the end of a pipe or tube 39 having its other end connected to the manifold 37. A tube 41 has its one end positioned adjacent the free end of the bimetal 34 and its other end connected to the manifold 37. The lower end of the manifold 37, as viewed in FIGURE 1 of the drawings, terminates adjacent the bimetal 36 which is connected at one end to a swing plate 46 to control the opening at the lower end of the manifold 37. A manual controller 43 is rotatable about a shaft 44 and is secured to the other end of the bimetal 36. Movement of the swing plage by either the bimetal or controller 43 varies the leak to the manifold and thus controls heating in the system.

It is apparent that, when the ends of all of the tubes are closed by their respective elements, no air is admitted to the control passage 14. Thus, all of the fluid issuing into the analog amplifier 13 is diverted to the channel 17 and over the heater 18 so as to produce maximum heating. As either one of the bimetallic elements 33 or 34 on swing plate 46 moves away from the end of its associated tube, air is admitted to the control passage 14 in proportion to the movement of the bimetals and the shape of the control port and the pressure on the left side, as viewed in FIGURE 1, of the stream of fluid issuing into the amplifier 13 is raised while the pressure on the right side of the stream is unaltered initially at least. The power stream moves towards the right and controlled proportions of the fluid by-pass the heater 18, the proportion of the by-passed fluid being a function of the degree of opening of the ends of the tubes. For instance, as the outside air becomes warmer, the element 33 moves its free end away from the pipe 39 and an increased amount of air by-passes the heater 18. This is a desirable effect since, as the outside air heats up, there is a lesser demand for interior heating. Assuming for a moment that the outside temperature does not vary, basic control of the system is assumed by the element 36 which monitors in car temperature and by the element 34 which senses the temperature of the output fluid. Movement of the elements 34 and 36 is in such a sense as to balance the system in accordance with internal conditions. The element 36 which measures in car temperature is located at the dashboard in an attempt to introduce an additional effect related to heating of the sun on the vehicle to the car temperature measurement. Since the sensor 36 measures temperature in the actual region to be controlled and the manual control 43 expresses the desires of the passengers, it is desirable for these controls to have a more pronounced effect upon the system than the sensors 33 and 34. In order to accomplish the desired result, movement of either the sensor 36 or controller 43 introduces a non-linear control function into the system. The function obtained may have a characteristic similar to that illustrated in FIGURE 13–27 on pages 13–36 of the Cadillac 1964 Shop Manual. In order to obtain the desired non-linear function, a linkage may be employed to control the position of the swing plate 46, the linkage providing the desired non-linear function.

Figure 2:
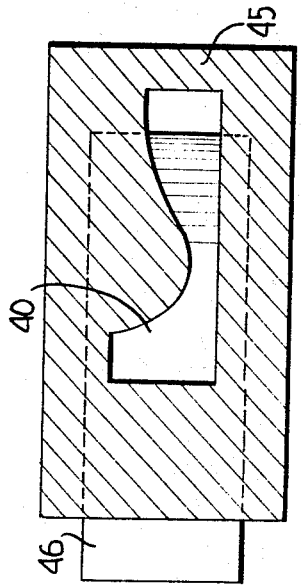
FIGURE 2 is a view taken along section line 2—2 of FIGURE 2.

Another technique which may be employed, this being the technique illustrated and described herein, is to shape either the swing plate or the orifice at the end of the manifold 37. Referring specifically to FIGURE 2 of the accompanying drawings, the swing plate 46 is rectangular (unshaped in the present sense) while the orifice 40 formed in a block 45 at the end of manifold is so shaped. It will be noted that the percentage of change of the opening is not only a function of the change of temperature but also of the initial temperature set point. Thus, at the two extreme ends and in a range just above the percentage point of the temperature scale changes in position of the swing plate produce only small changes in the opening while changes in the other regions of the scale produce relatively large changes in the opening. This configuration produces the non-linear function desired in the system.

An additional feature of the apparatus that is desirable, although not essential, is to provide for increase of the idle speed of the vehicle when the air compressor 12 is operating. Referring again to FIGURE 1, the compressor may be driven from the engine through a clutch 47. The clutch may be controlled in various ways, one way being to sense the compressor pressure and electrically engage the clutch when the pressure in the compressor falls below a certain level. Since it is desired to have the vehicle on fast idle only when the compressor is coupled to the engine, the same pressure sensor, utilized to control the clutch 47, may be employed to control a fast-idle diaphragm or valve on the carburetor; this element being illustrated as block 48 in the accompanying drawings. In such a system, the clutch is disengaged when the pressure in the compressor rises above a certain level. Fast idle may be terminated at this time by a control function derived from the pressure sensor. Other methods may be employed to achieve the fast-idle function, as will be indicated subsequently.

The apparatus as described provides certain basic functions in air-conditioning systems with a minimum of complexity. The temperature door function is provided by the analog amplifier 13 without the necessity for conventional moving parts, electrical components and electro-mechanical transducers or actuators. The mode door operation is also provided by use of a bimetallic element and pure fluid amplifier and fast-idle control is provided by an independent subsystem operating from a readily available signal source. The system is quite simple and inexpensive and yet provides a very high degree of control although not a maximum degree of control. The control functions which are not provided automatically are recirculation control, suction valve control and water control valve control. The recirculation control in the wholly automatic system is in two parts. Recirculated air is employed during maximum cooling and the same door shuts off outside air while the motor temperature is below 120° F. This latter function is achieved in the prior systems by sensing the engine water temperature to derive a control function. The same arrangement may be employed in the present system. The other part of recirculation control; that is, during maximum cooling, may be effected in the present system manually. The control of the heater and of the evaporator at the two extremes of the temperature scale may also be performed manually by using push buttons to energize solenoids or may be operated directly from the manual control lever 43. Thus, when it is extremely warm outside, the lever 43 may be moved completely counterclockwise to pull on a Belsen wire connected to the valve 19 in the heater unit. When the Belsen wire is pulled, it closes the valve so as to discontinue the flow of hot engine water through the heater.

Figure 3:
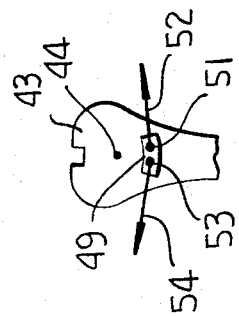
FIGURE 3 is a detailed diagram of a part of the control apparatus of FIGURE 1.

Referring specifically to FIGURE 3, control of the valve 19 (see FIGURE 1) may be accomplished by providing the controller 43 with a slot 49 positioned relative to the shaft 44 such that one end of the slot picks up a member 51 towards the end of its maximum clockwise rotation which is the maximum "cool" position. The member 51 is connected to a Belsen wire 52, in turn connected to operate the valve 19. Thus, when temperatures are extremely hot, the controller 43 may be rotated completely clockwise so as to eliminate all heating from the system. By a similar arrangement, all cooling may be eliminated from the system when extreme cold is encountered. A second member 53 is positioned in the slot 49 and is connected to a Belsen wire 54 connected to control a suction throttling valve 55 in the evaporator 11. When the controller 43 is moved to a maximum extent counterclockwise, the lower end of the slot 49 picks up the member 53, pulls on the Belsen wire 54 and closes the suction throttling valve so that the cooling effect is eliminated.

Figure 4:
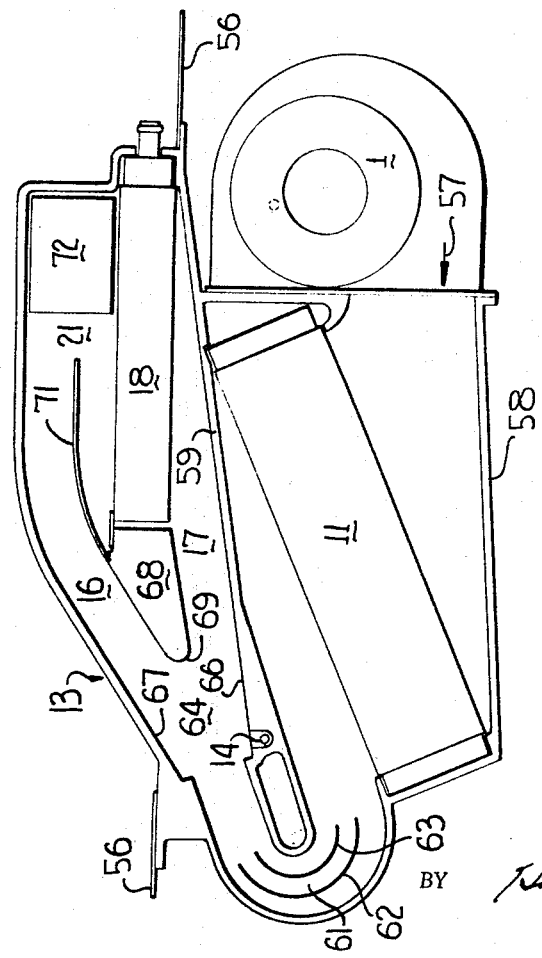
FIGURE 4 is an illustration of the actual relative physical arrangement of various parts of the apparatus for installation in a motor vehicle.

Referring now specifically to FIGURE 4 of the accompanying drawings, there is illustrated the actual relative physical arrangement of the blower 1, the evaporator 11, the analog amplifier 13, the heater 18 and the fire wall of the vehicle. The structure is located partly on the engine side and partly on the passenger side of the automobile fire wall which is designated by the reference numeral 56. More particularly, the blower 1 and evaporator coil 11 lie on the engine side of the fire wall 56 and the heater radiator 18, and a duct 21 lie on the passenger side with the analog amplifier 13 being located partially in both compartments.

Air is inducted into the system by the blower 1 which directs air along a path indicated by arrow 57 into a chamber defined by a lower wall 58 as viewed in FIGURE 3 and an upper wall 59. Arranged along the diagonal of this chamber are the evaporator coils 11. In this way, the coils provide a very large surface to the air flow. The air, after passing over the coils 11, is turned through substantially a 180° angle by means of a bend nozzle 61 having flow straightening vanes 62 and 63 for maintaining the final direction of flow in spite of the sharp bend in the nozzle 61. The air from the nozzle 61 enters an interaction region 64 of the amplifier 13. The interaction region is defined by a bottom sidewall 66, as viewed in FIGURE 3, an upper sidewall 67, and a divider 68 having a curved end region 69 directed generally towards the nozzle 61. The amplifier is asymmetrical, part of the amplifier defined by the walls 66 and 67 and the divider 68 being moved upwardly relative to the centerline of the nozzle. The set back of the wall 66 from the nozzle 61 is less than the set back of the wall 67 and also the major portion of divider is located above the centerline of the nozzle. As a result of this arrangement and in addition the relatively close spacing of the curved section 69 and divider 68 relative to the outlet orifice of the nozzle, the device operates as a proportional boundary layer control type amplifier wherein, in the absence of control signals, the stream is wholly deflected to the output passage 17. Angled across the passage 17 is the heater radiator 18 which actually extends from the divider 68 towards the right and just about into engagement with the upper surface of the wall 59. Thus, the heater radiator 18 is disposed across the entire outlet of the passage 17. A wall 71 extends to the right, as viewed in FIGURE 3, from the divider 68 and is generally parallel to the sidewall 67, thereby defining a continuation of the passage 17. The wall 71 terminates about half way along the length of the heater radiator 18 so that, to the right of this region, the two passages 16 and 17 converge to form the passage 21. The passage 21 communicates with a duct 72 which leads to the diverter 22.

Control passage 14 communicates with the manifold 37 as indicated in FIGURE 1. It should be noted that the element 33 is disposed in a passage which is located on the engine side of the fire wall whereas the element 34 located in passage 21 and the element 36 and its manual control 43 are located on the passenger side of the fire wall. In order to eliminate the necessity of bringing the manifold 37 into the passenger compartment, a large-diameter tube may be brought through the ducting to the passenger compartment and presented to the swing plate 46. Thus, this arrangement requires only a single opening in the fire wall for installation.

Referring now specifically to FIGURE 4 of the accompanying drawings, there is illustrated an alternative arrangement of a portion of the apparatus illustrated in FIGURE 1. Several of the functions provided in FIGURE 1 are accomplished in a different manner and, in addition, certain other functions are provided. The system is again provided with an external air inlet duct 73 and a recirculating air duct 74. The ducts 73 and 74 converge to form a common inlet duct 76 to a blower 77. The blower directs air over an evaporator coil system 78 and then through a turn nozzle 79 (which is illustrated as a straight passage in FIGURE 4) to an analog amplifier 81. Amplifier 81 is provided with a first outlet passage 92 and a second outlet passage 83. The passage 82 has a heater element 84 arranged therein and the passages 82 and 83 converge downstream of the heater 84 to form a common duct 86.

The amplifier 81 is provided with a control passage 87 connected to a manifold such as manifold 37 of FIGURE 1 so that various input signals may be applied thereto.

The amplifier 81 differs from the amplifier 13 of FIGURE 1 in the construction of the center divider. The center divider 88 of the amplifier 81 has a deep recess formed centrally of the end facing the duct 79. The central recess communicates with an orifice 89 arranged to dump air from the system either to the outside environment or to passageway 76. This construction provides a type of automatic variable flow speed operation. When all of the air is directed to either the passage 82 or passage 83, all of the air passes into the passenger compartment. These two conditions exist only under extreme temperature conditions. When the conditions are not extreme and the fluid divides in some proportion between passages 82 and 83 a portion of the fluid, depending always on the degree of deflection from the central position, passes through the orifice 89 and is dumped so that the total of air flow to the passenger compartment is reduced relative to the flow when the stream is completely deflected to one or the other outlet passages. By this arrangement, one is able to obtain a degree of control over the volume rate of air entering the passenger compartment as a function of heating or cooling demand. It is desirable to keep the volume rate of air entering the passenger compartment at as low a level as possible, commensurate with the required heating or cooling effect so as to reduce the background noise level in the vehicle.

The heater 84 is provided with a water cut-off valve 91 and the evaporator 78 is provided with a control for the throttling valve 92. In this embodiment of the invention, the valve 91 is controlled by a pull knob 93 which, when it is pulled out, closes the water valve. A second pull knob 94 is also provided at the control area for the air-conditioner. This button, when pulled out, closes the suction throttling valve 92 so as to terminate cooling in the evaporator coils 78. A manual controller 96 is also provided which is substantially identical with that illustrated in FIGURE 1, the showing of the control 96 being strictly diagrammatic in FIGURE 4.

Fast-idle control in the arrangement of FIGURE 4 is effected by a temperature sensing element 97 provided in conjunction with the evaporator coils 78. In some air-conditioning systems, the temperature element 97 is employed to control the compressor; that is, it is employed to open and close an electrical switch 98 employed to control an electromagnetic clutch for controlling coupling of the compressor to the engine. The same switch 98 may be employed to control a solenoid 99. The solenoid 99 controls the fast-idle adjustment 101 on the carburetor. Thus, when the electrical signal from the switch 98 couples the compressor to the engine, the carburetor is simultaneously adjusted to increase its idling speed.

In this embodiment of the invention, the blower 77 is provided with a manually operated three-pole switch 102 to provide one additional speed of the blower. This adjustment, in conjunction with the center-dump orifice 89 of the amplifier 81 provides a quite complete range of air flow into the passenger compartment. Obviously, the variable speed arrangement of FIGURE 4 may be employed with the device of FIGURE 1.

In order to control the ratio of external-to-internal air fed to the blower 77, the apparatus of FIGURE 4 employs a bimetallic element 103 which controls a pair of flapper valves, i.e. vanes 104 and 106. The vane 104 is in the external air duct 73 and the vane 106 is in the recirculating air duct 74. The element 103 is responsive to the external air temperature; that is, ambient temperature of the atmosphere, and differentially rotates the vanes 104 and 106 so that, as the vane 104 is moved to increasingly open the passage through the duct 73 as the flapper valve 106 is moved to increasingly close the opening through the duct 74 and vice versa. This system is adjusted so that at 70° F. 100 percent external air is introduced to the system. As the external air temperature changes from 70° F. as indicated by the element 103, the percentage of external air is reduced progressively and the percentage of recirculated air increased progressively to a limit condition of 20 percent external air and 80 percent recirculated air which condition exists for element 103 temperatures less than 20° F. or higher than 115° F. A mechanical override may be employed so that the flapper valve 104 is held fully closed until the engine temperature rises above 120° F.

It is apparent that various features of FIGURES 1 and 4 may be combined to provide a maximum or minimum control. At the minimum, a temperature door control is provided in which the control elements are completely compatible with operation of a pure fluid amplifier with no moving parts. No transducers, electrical systems or mechanical actuators are required. Mode door and variable blower functions are also available without a requirement of moving parts. Subsystems which are simple and operate from readily available control sources may provide idle speed control and recirculation control with cold engines. A simple bimetal control may be employed for a full range of recirculation control. Heater and evaporator controls may be eliminated since they are useful only under extremes of operations. Alternatively, such functions may be readily provided by various types of simple manual controls.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. An air-conditioning system for an enclosure comprising cooling means for air, means for inducting air into the system and directing the inducted air over said cooling means, a fluid amplifier having an interaction region having entering therein at least a first and a second output passage, a control passage and a power stream forming channel, said channel receiving fluid from said cooling means, flow of fluid through said interaction region reducing the pressure therein to below ambient pressure, said amplifier directing substantially all fluid flow from said channel to said first output passage in the absence of supply of fluid to said control passage, a heating means located in said first output passage, said output passages converging to form a further passage downstream of said heating element and temperature responsive means for varying the flow of external fluid to said control passage in such a sense as to maintain a desired temperature.

2. The combination according to claim 1 wherein said fluid amplifier has a third output passage located between said first and second output passages, and means for diverting fluid received by said third output passage from said system.

3. The combination according to claim 2 further comprising means for introducing said diverted fluid to the low pressure side of said means for inducting air means for supplying ambient air to the low pressure side of said means for inducting air, and means responsive to the temperature of said ambient air for proportioning the relative quantities of ambient and recirculating air supplied to said low pressure side of said means for inducting.

4. The combination according to claim 1 wherein said temperature responsive means include a fluid conduit having an opening therein, a thermal element, a movable closure for said opening in said conduit, means connecting said closure to said thermal element for movement thereby in response to temperature changes.

5. The combination according to claim 4 wherein said opening is contoured such that the area of the opening exposed is a non-linear function of movement of said movable closure.

6. The combination according to claim 4 further comprising a manual temperature set controller, one end of said thermal element being secured to said manual controller for movement thereby to effect movement of said movable closure.

7. The combination according to claim 6 further comprising a cooling control on said cooling means and means for adjusting the cooling control to substantially terminate cooling upon movement of said manual controller to a position calling for near-maximum heating.

8. The combination according to claim 6 further comprising a heating control on said heating means and means for adjusting the heating control to substantially terminate heating upon movement of said manual controller to a position calling for near-maximum cooling.

9. An air-conditioning system for an enclosure comprising cooling means for air, means for inducting air into the system and directing the inducted air over said cooling means, a fluid amplifier having an interaction region having entering therein at least a first and a second output passage, a control passage and a power stream forming channel, said channel receiving fluid from said cooling means, the rate of flow of fluid through said system and the size of said interaction region being such that said flow reduces the pressure therein to below ambient pressure, said amplifier directing substantially all fluid flow from said channel to said first output passage in the absence of supply of fluid to said control passage, a heating element located in said first output passage, said output passages converging to form a further passage downstream of said heating element and temperature responsive elements located in said enclosure and at the output end of said means for inducting air, said elements varying the flow of external fluid to said control passage in such a sense as to maintain a desired temperature.

10. An air-conditioner system for a motor vehicle having a driver compartment and an engine compartment, comprising cooling means for air, means for inducting air into the system and directing the inducted air over said cooling means, a fluid amplifier having an interaction region having entering therein at least a first and a second output passage, a control passage and a power stream forming channel, said channel receiving fluid from said cooling means, flow of fluid through said interaction region reducing the pressure therein to below ambient pressure, said amplifier directing substantially all fluid flow from said channel to said first output passage in the absence of supply of fluid to said control passage, a heating element located in said first output passage, said output passages converging to form a further passage downstream of said heating element, temperature responsive elements for varying the flow of external fluid to said control passage in such a sense as to maintain a desired temperature, a pure fluid diverter valve having two output passages, said valve being connected to receive fluid from said further passage, control means for switching said fluid flow from one to the other of said output passages of said diverter valve, one of said output passages of said diverter valve directing fluid to the upper region of said driver compartment and the other output passage directing fluid to the lower region of said driver compartment.

11. An air-conditioner system for a motor vehicle having a driver compartment and an engine compartment, comprising cooling means for air, means for inducting air into the system and directing the inducted air over said cooling means, a fluid amplifier having an interaction region having entering therein at least a first and a second output passage, a control passage and a power stream forming channel, said channel receiving fluid from said cooling means, flow of fluid through said interaction region reducing the pressure therein to below ambient pressure, said amplifier directing substantially all fluid flow from said channel to said first output passage in the absence of supply of fluid to said control passage, a heating element located in said first output passage, said output passages converging to form a further passage downstream of said heating element, temperature responsive elements for varying the flow of external fluid to said control passage in such a sense as to maintain a desired temperature, a pure fluid diverter valve having two output passages, said valve being connected to receive fluid from said further passage, control means for switching said fluid flow from one to the other of said output passages of said diverter valve, said control means being responsive to the temperature of the fluid in the region of said valve, one of said output passages of said diverter valve directing fluid to the upper region of said driver compartment and the other output passage directing fluid to the lower region of said driver compartment.

12. The combination according to claim 6 wherein said fluid amplifier has a third output passage located between said first and second output passages, and means for diverting fluid received by said third output passage from said system.

13. The combination according to claim 6 further comprising a pair of ducts, a further duct formed by the confluence of said pair of ducts, said further duct being connected to the lower pressure side of said means for inducting air, and temperature responsive means for differentially controlling flow through said pair of ducts, one of said ducts being positioned to induct air from the driver compartment and the other of said pair of ducts being positioned to induct external air.

14. An air-conditioning system for an enclosure comprising means for inducting air into the system, a fluid amplifier having an interaction region having entering therein at least a first and a second output passage, a control passage and a power stream forming channel, said channel receiving fluid from said means for inducting, flow of fluid through said interaction region reducing the pressure therein to below ambient pressure, said amplifier directing substantially all fluid flow from said channel to said first output passage in the absence of supply of fluid to said control passage, a heating means located in said first output passage, said output passages converging to form a further passage downstream of said heating element and temperature responsive means for varying the flow of external fluid to said control passage in such a sense as to maintain a desired temperature.

15. The combination according to claim 14 wherein said fluid amplifier has a third output passage located between said first and second output passages, and means for diverting fluid received by said third output passage from said system.

16. The combination according to claim 15 further comprising means for introducing said diverted fluid to the low pressure side of said means for inducting air.

17. The combination according to claim 14 further comprising means for cooling at least a portion of the air supplied to said further passage.

18. An air-conditioner system for a motor vehicle having a driver compartment and an engine compartment, comprising means for inducting air into the system, a fluid amplifier having an interaction region having entering therein at least a first and a second output passage, a control passage and a power stream forming channel, said channel receiving fluid from said means for inducting, flow of fluid through said interaction region reducing the pressure therein to below ambient pressure, said amplifier directing substantially all fluid flow from said channel to said first output passage in the absence of supply of fluid to said control passage, a heating element located in said first output passage, said output passages converging to form a further passage downstream of said heating element, temperature responsive elements for varying the flow of external fluid to said control passage in such a sense as to maintain a desired temperature, a pure fluid diverter valve having two output passages, said valve being connected to receive fluid from said further passage, control means for switching said fluid flow from one to the other of said output passages of said diverter valve, one of said output passages of said diverter valve directing fluid to the upper region of said driver compartment and the other output passage directing fluid to the lower region of said driver compartment.

19. The combination according to claim 18 further comprising a pair of ducts, a further duct formed by the confluence of said pair of ducts, said further duct being connected to the lower pressure side of said means for inducting air, and temperature responsive means for differentially controlling flow through said pair of ducts, one of said ducts being positioned to induct air from the drive compartment and the other of said pair of ducts being positioned to induct external air.

20. The combination according to claim 18 further comprising means for cooling at least a portion of the air supplied to said further passage.

21. An air-conditioning system for an enclosure comprising cooling means for air, means for inducting air into the system and directing the inducted air over said cooling means, a fluid amplifier having an interaction region having entering therein at least a first and a second output passage, a control passage and a power stream forming channel, said channel receiving fluid from said cooling means, said amplifier directing substantially all fluid flow from said channel to said first output passage in the absence of supply of fluid to said control passage, a heating means located in said first output passage, said output passages converging to form a further passage downstream of said heating element and temperature responsive means for varying the flow of external fluid to said control passage in such a sense as to maintain a desired temperature.

References Cited by the Examiner

UNITED STATES PATENTS 3,198,431    8/1965    Gesell _____ 165—30

ROBERT A. O'LEARY, *Primary Examiner.*

CHARLES SUKALO, *Examiner.*